United States Patent [19]
LeMaster

[11] Patent Number: 6,120,633
[45] Date of Patent: Sep. 19, 2000

[54] METHOD OF FABRICATING A SELF PLEATING FILTER MEDIA

[75] Inventor: Harley LeMaster, Darlington, S.C.

[73] Assignee: HRS Textiles, Inc., Florence, S.C.

[21] Appl. No.: 09/262,629

[22] Filed: Mar. 4, 1999

[51] Int. Cl.$^7$ .............................. B01D 46/52; B01D 39/16
[52] U.S. Cl. .......................... 156/181; 156/196; 156/200; 156/205
[58] Field of Search ................................... 156/62.2, 181, 156/196, 200, 205, 207, 290, 292

[56] References Cited

U.S. PATENT DOCUMENTS

| | | |
|---|---|---|
| 4,042,358 | 8/1977 | Frohmader . |
| 4,199,387 | 4/1980 | Hladik . |
| 4,629,474 | 12/1986 | Thornton . |
| 5,167,740 | 12/1992 | Michaelis et al. . |
| 5,456,836 | 10/1995 | Jeffery et al. . |

*Primary Examiner*—Sam Chuan Yao
*Attorney, Agent, or Firm*—Hardaway/Mann IP Group Nexsen Pruet Jacobs & Pollard, LLP

[57] ABSTRACT

A self-supporting filter media, comprising a batt made of thermoplastic fibers, and heat induced scores provided at predetermined intervals along a length of the batt. And, a method of fabricating a self-supporting filter media, the method comprising the steps of: providing a thermoplastic batt of fibers; adding an adhesive to the batt; heating the batt and the adhesive to bind the fibers with the adhesive; heat scoring the batt at periodic intervals for producing a scored batt of fibers; and rolling the scored batt of fibers for storage or shipment.

6 Claims, 5 Drawing Sheets

METHOD OF FABRICATING A SELF PLEATING FILTER MEDIA

BACKGROUND OF THE INVENTION

The present invention relates generally to filters, and more particularly to pleated air filters for use in residential air filtration and industrial air filtration.

Pleated air filters are normally produced by taking a non-woven fabric and combining that fabric with a wire or some other support to maintain the pleat in the fabric while air passes through the unit. The wire is normally attached to the fabric by an adhesive, pressing the fabric to the wire to achieve a laminated structure. The laminated structure is then pleated or formed into an accordion like structure which is then placed into a fiberboard or cardboard frame for use in an air handling unit. The use of wire supported pleats, however, requires additional equipment needs and also creates environmental concerns regarding the disposal of used filters.

As an alternative to the wire supported media, self-supporting pleated filter media has been developed. For example, U.S. Pat. No. 5,167,740 to Michaelis et al ("Michaelis")., discloses a method of making a filter insert of non-woven material in the form of a pleated pack which is self-supporting and consists of thermally weldable non-woven material. The pleats in Michaelis are formed by folding the material to form the pleats and welding the edges of the material together.

Also, for example, U.S. Pat. No. 5,456,836 to Jeffery, et al. ("Jeffery") discloses a self supporting filter element made of a precursor fiber web containing heat-shrinkable fibers or binder fibers or both. Jeffery teaches the shaping of the filter element and then the submitting of the element to a rigidification process.

The apparatuses of Michaelis and Jeffery, however, require additional equipment for processing and, because of their dimensions and rigidity, they require more attention and space, and, thus, require increased shipping cost.

Clearly, there is room for improvement in the art.

SUMMARY OF THE INVENTION

It is an object of the present invention to provide pleated filter media for use in residential and industrial air filtration processes.

It is another object of the present invention to make an environmentally friendly filter.

It is a further object of the present invention to produce a filter media which can be assembled into a finished product at greatly reduced equipment and labor costs.

It is an even further object of the present invention to provide a filter media which can be finished by hand.

It is a further and more particular object of the present invention to make a pleated filter media which does not require the making of pleats in the material.

These and other objects of the invention are achieved by a self-supporting filter media, comprising: a batt made of thermoplastic fibers; and, scores provided at predetermined intervals across a width of the batt. These and other objects of the invention are also achieved by a method of fabricating a self-supporting filter media, the method comprising the steps of: providing a thermoplastic batt of fibers; adding an adhesive to the batt; heating the batt and the adhesive to bind the fibers with the adhesive; heat scoring the batt at periodic intervals for producing a scored batt of fibers; and rolling the scored batt of fibers for storage or shipment.

DETAILED DESCRIPTION

In accordance with this invention, it has been found that a filter for domestic and industrial air conditioning applications may be formed without the need for integral structural members so as to render material readily recyclable without need for separation of metallic or other difficult to separate materials. The filter of this invention is in essence a batt of polymeric fibers which are adhered with a thermoplastic binder, a thermoplastic resin or a similar adhesive material. The batt itself is formed into a filter producing condition by periodically heat scoring the batt in areas where folds are desired. The batt can be rolled and shipped to diverse locations for fabrication into the final filter assembly which may comprise fiberboard or cardboard framing to which the filter media is attached. Many other advantages and features will become apparent from a reading of the following description given with reference to the various figures of drawing.

Figure 1A:
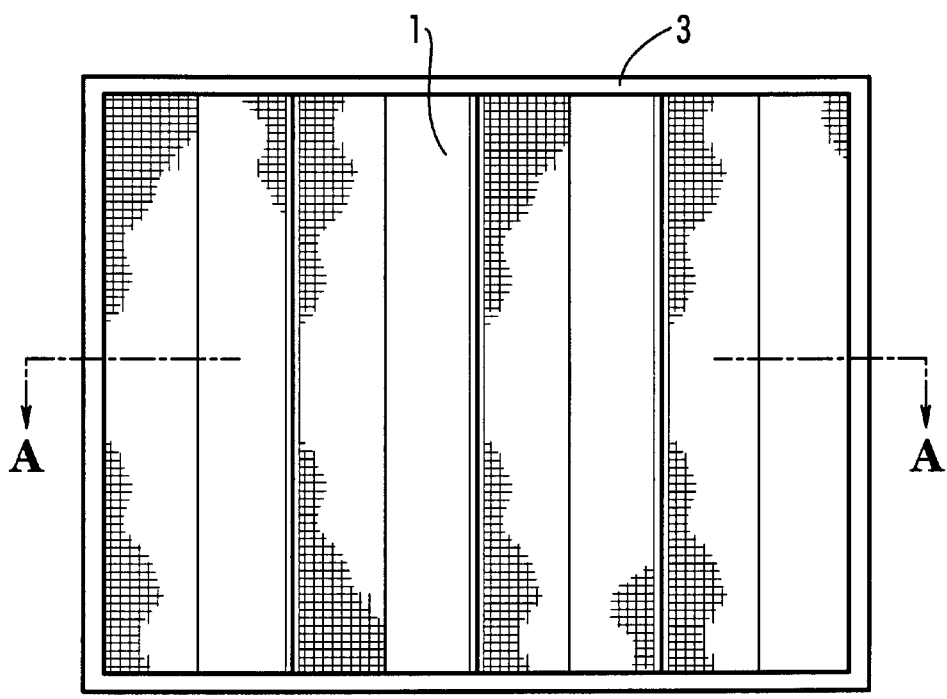
FIG. 1A is a perspective view of the framed filter media made in accordance with the present invention.
Figure 1B:
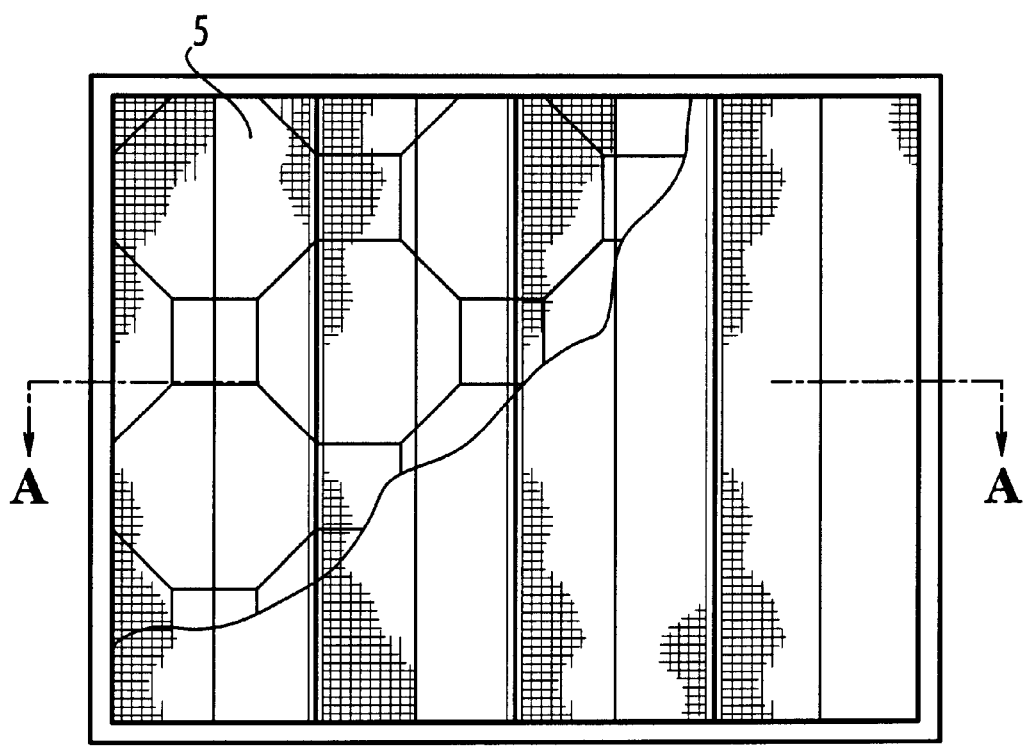
FIG. 1B is a perspective view of the framed filter media as shown in FIG. 1A, further comprising a honeycomb overlay for support.

With reference to FIG. 1 of the present invention, a preferred embodiment of the present invention is shown. A filter media 1 is shown secured in a frame 3. The filter medium 1 comprises a batt of fibers which may be thermoplastic fibers, thermoplastic fibers which are impregnated with a thermoset binder, or some suitable combination of fibers for forming a filter media. In a preferred embodiment of the present invention, the filter media 1 comprises a polyester batt which is adhered with thermoplastic fibers such as vinyl fibers or similar fibers constituting a thermal setting resin. The filter media 1 is manufactured by methods known in the art and may be bound in any conventional framing structure 3, such as a fiberboard frame, a cardboard frame and the like.

Figure 2:
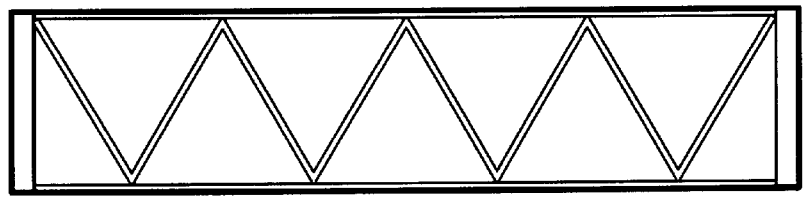
FIG. 2 is a cross sectional view of FIG. 1A along line A—A.

Filter media 1 is a pleated structure, as seen in FIG. 2, and is secured within the structure of frame 3 by an adhesive which is applied either to the frame 3, the edges of the filter media 1 or to both. Pleated filter media 1 is further secured within frame 3 by a honeycomb overlay 5 which may be present on the front, the back, or on both the front and back of the framed filter media 1. Honeycomb overlay 5, may comprise thermoplastic fibers, cardboard, or some other easily removable, easily recyclable material. Filter media 1 may be secured between the honeycomb overlay 5 by either an adhesive or by heat setting. The honeycomb overlay 5 is constructed such that a large majority of the filter media surface is exposed for use.

In a preferred embodiment of the invention, the pleated filter media 1 is formed and framed within a rectangular structure. However, the filter media 1 may be cut to any shape and size which may be required by the end user and is not limited to use in the conventional rectangular frame 3.

Figure 3:
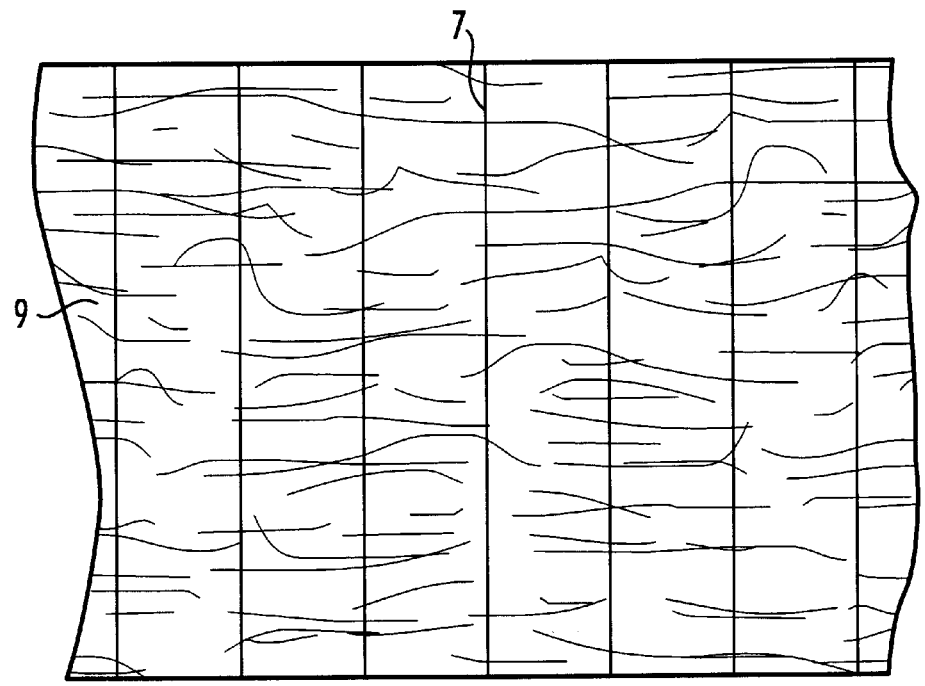
FIG. 3 is a perspective view of the scored filter media.
Figure 4:
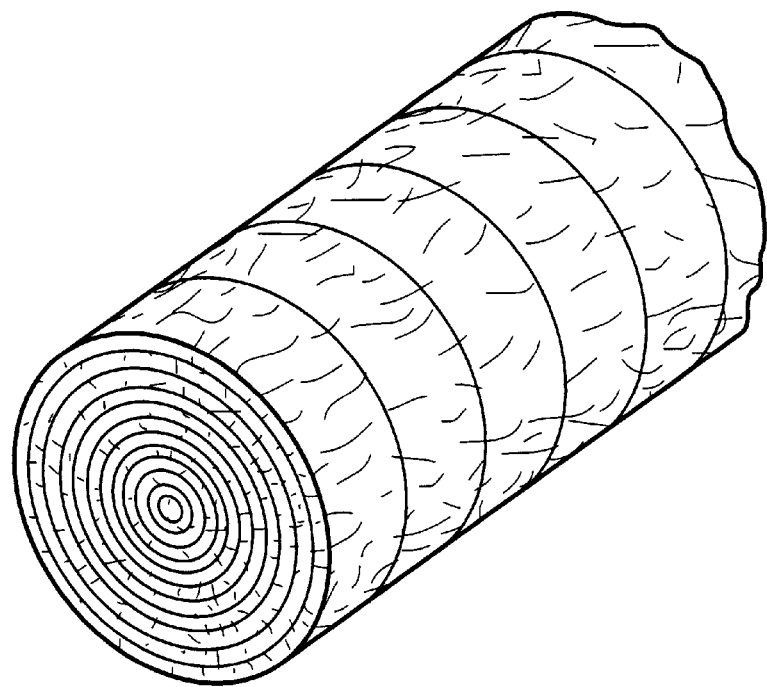
FIG. 4 is a perspective view of the rolled material.

At the delivery end of the manufacturing process, while the filter media 1 is still in its unaltered state 9, the filter media is scored. As seen in FIG. 3 of the drawings, filter media 1 comprises score lines 7 at predetermined intervals along a length of the filter media 1. The scoring intervals may be varied in accordance with the number or amount of pleating required. The filter media 1 may be scored along a width or along both a length and a width, if desired. In the preferred embodiment, however, filter media 1 is scored along its width while the media 1 is at an elevated temperature of at least 240 degrees fahrenheit. The process of scoring the filter media 1 at an elevated temperature provides the filter media 1 with a memory such that when it is reheated for later use, the media 1 will fold and form a series of pleats without the aid of machinery. Once scored, the filter media 1 may be rolled for storage or shipment (See FIG. 4). The rolled filter media 1, in its unpleated state, is relatively easy to handle, takes up a lesser amount space than prior art batts, and, thus, requires lower shipping cost.

Figure 5:
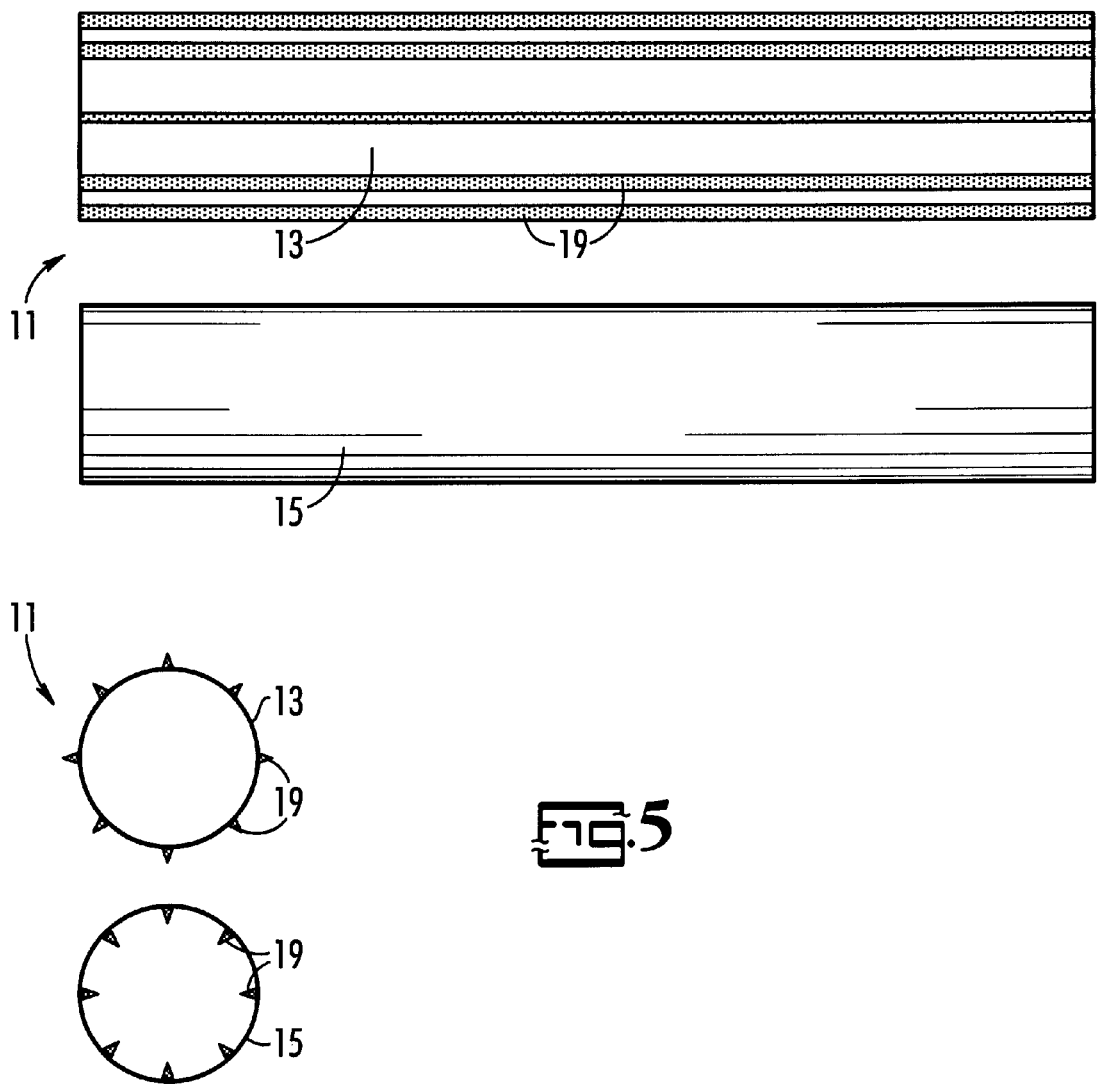
FIG. 5 is a schematic view of the scoring process.

In a preferred embodiment of the present invention, score lines 7 are made by an apparatus, such as a calendar roll 11 (FIG. 5). Filter media 1 comes into communication with calendar roll 11, passing between upper plate 13 and lower plate 15, where the filter media 1 is scored. The calendar roll 11 used in the preferred embodiment comprises a hardened material, such as steel. In a preferred embodiment of the present invention, calendar rolls of hardened steel are designed to match or mate at desired intervals to produce a score. Different diameters may be used to produce different intervals between the scores. The scoring process is aided by the fact that the material is at an elevated temperature during the process so as to be permanently heat set by the pressure of the calendar roll 11.

Calendar roll 11 comprises an upper plate 13 and a lower plate 15 which are rotatable and connectable. Upper plate 13 and lower plate 15 are constructed such that they provide a circumference which comprises sharp points 19 located at preferably equidistant intervals. Points 19 of upper plate 13 are positioned outwardly to come into communication with the filter media 1. The points 19 of lower plate 15 are positioned inwardly. At the area where points 19 of the lower plate 15 are position inwardly, a mating area (not shown) for the points of the upper plate 13 may be provided but is not required.

Additionally, in a preferred embodiment, points 19 of upper plate 13 are heated such that as filter media 1 passes between upper plate 13 and lower plate 15, the points 19 of upper plate 13 come into contact with the filter media 1 and produce scores 7 in the filter media 1. In order to avoid tearing or damaging the filter media 1, upper plate 13 and lower plate 15 are separated in a direction such that they do not collide during rotation.

Figure 6:
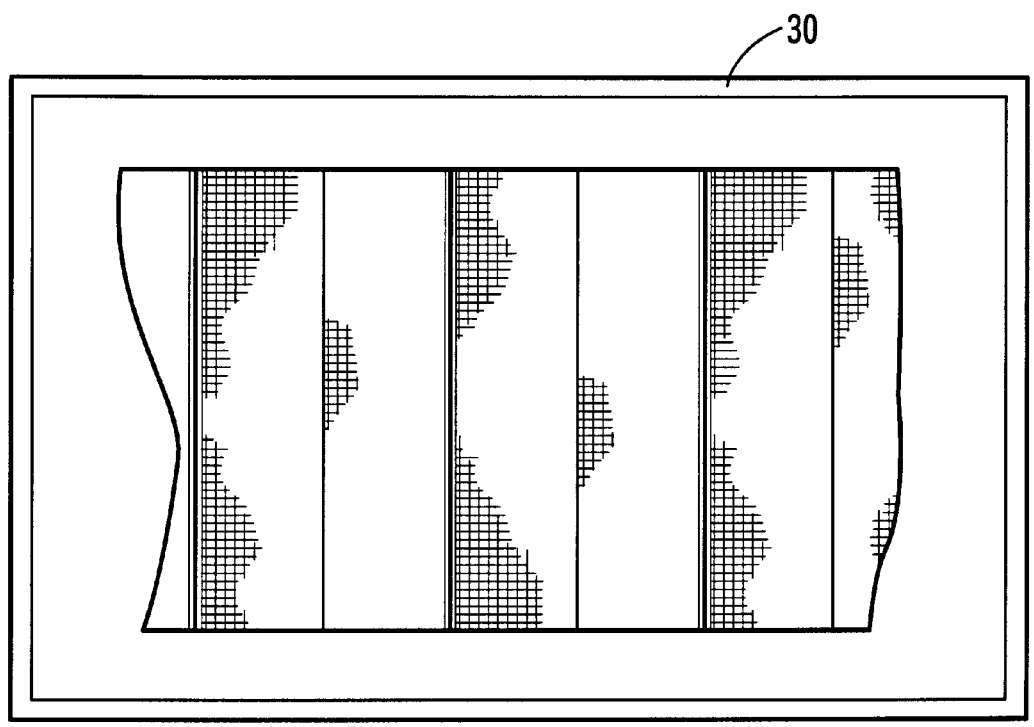
FIG. 6 is a schematic of the self-pleating process.

When the scored filter media 1 is ready to be used in a filter or other configuration, the material is reheated by conventional methods. In a preferred embodiment, scored filter media 1 is unrolled and placed into a heated environment, such as heated area 30 of FIG. 6, until it reaches an elevated temperature. The desired temperature is approximately equal to the temperature at which the media 1 was previously scored. The scored filter media 1 is then moved to a containment device (not shown) where the scored filter media 1 folds due to its thermoplastic nature, thus, forming a series of pleats. Once the scored filter media 1 has been allowed to pleat, the media 1 may then be cut to size and placed into a framing structure, such as a conventional fiberboard or cardboard frame assembly, or such other use as is desired.

Thus a novel self-supporting pleated filter media has been described. The filter media of the present invention can be readily used in any residential and industrial air filtration processes and is environmentally friendly because of its self-supporting feature. The filter media can be assembled into a finished product by hand greatly reducing the equipment and labor costs. There is no need for making pleats in the filter media, either by hand or machine, seeing that the filter media is self pleating upon being re-heated and placed into a containment are at. The fact that the filter media is pleated at an elevated temperature provides for a filter media, which when cooled, retains a memory at its scored lines, by which to pleat itself.

It will, therefore, be readily understood by those persons skilled in the art that the present invention is susceptible of broad utility and application. Many embodiments and adaptations of the present invention other than those described, as well as many variations, modifications and equivalent arrangements will be apparent from or reasonably suggested by the present invention and foregoing description thereof, without departing from the substance or scope of the present invention. The foregoing disclosure is not intended to be construed to limit the present invention or otherwise to exclude any such other embodiments, adaptations, variations, modifications and equivalent arrangements, the present invention being limited only by the claims appended hereto and the equivalents thereof.

What is claimed is:

1. A method of fabricating a self-supporting filter media, the method comprising the steps of:

providing a thermoplastic batt of fibers said batt having a first edge and a second edge;

adding an adhesive to said batt of fibers;

heating said batt and said adhesive to bind said fibers with said adhesive;

heat scoring said batt at periodic intervals from said first edge to second edge to produce score lines and form a scored batt of fibers;

heating said scored batt of fibers;

removing said scored batt from said heat whereby said scored batt of fibers folds along said score lines to form a series of pleats; and securing said series of pleats in a desired medium.

2. A method of fabricating a self-supporting filter media according to claim 1, wherein said desired medium is a cardboard filter frame.

3. A method of fabricating a self-supporting filter media according to claim 1, wherein said desired medium is a fiberboard filter frame.

4. A method of fabricating a self-supporting filter media according to claim 1, wherein said fibers are polyester fibers.

5. A method of fabricating a self-supporting filter media according to claim 1, wherein said adhesive is vinyl chloride.

6. A method of fabricating a self-supporting filter media according to claim 1, wherein said adhesive is a thermoplastic resin.

* * * * *